United States Patent [19]

Connor

[11] Patent Number: 5,148,776
[45] Date of Patent: Sep. 22, 1992

[54] COORDINATED WATER AND FUEL INJECTION SYSTEM

[76] Inventor: Michael J. Connor, 8926 Simeon Ct., Upper Marlboro, Md. 20772

[21] Appl. No.: 764,341

[22] Filed: Sep. 23, 1991

[51] Int. Cl.⁵ ............................................. F02B 47/02
[52] U.S. Cl. ................... 123/25 J; 123/25 A; 123/25 N
[58] Field of Search .............. 123/25 A, 25 J, 25 C, 123/25 N

[56] References Cited

U.S. PATENT DOCUMENTS

| | | | |
|---|---|---|---|
| 4,031,864 | 6/1977 | Crothers | 123/1 A |
| 4,096,829 | 6/1978 | Spears | 123/25 J |
| 4,351,289 | 9/1982 | Renda | 123/25 A |
| 4,448,153 | 5/1984 | Miller | 123/25 J |
| 4,461,245 | 7/1984 | Vinokur | 123/25 L |
| 4,480,616 | 11/1984 | Takeda | 123/25 J |
| 4,502,420 | 3/1985 | Mezjer | 123/25 J |
| 4,538,523 | 9/1985 | Merrick | 123/41 S |
| 4,553,504 | 11/1985 | Duggal et al. | 123/25 J |
| 4,558,665 | 12/1985 | Sandberg | 123/25 C |
| 4,960,080 | 10/1990 | O'Neill | 123/254 |

FOREIGN PATENT DOCUMENTS

| | | | |
|---|---|---|---|
| 3405899 | 9/1985 | Fed. Rep. of Germany | 123/25 J |
| 0000341 | 1/1982 | Japan | 123/25 J |
| 0173545 | 10/1984 | Japan | 123/25 J |
| 0173546 | 10/1984 | Japan | 123/25 J |
| 0877103 | 10/1981 | U.S.S.R. | 123/25 J |

Primary Examiner—E. Rollins Cross
Assistant Examiner—Erick Solis
Attorney, Agent, or Firm—Michael J. Tully

[57] ABSTRACT

A fuel and water injection system for an internal combustion engine in which a computer calculates the minimum fuel requirements to meet power demand and the water injection requirements to achieve smooth operation without engine knock or pre-ignition; and triggers electronic injectors mounted in the intake manifold or adjacent to the cylinders to achieve those requirements. Fuel and water injectors are connected to constant-pressure fluid supply systems such that the rate of delivery of liquid to the inlet manifold or cylinder is based on the pulse width and pulse repetition rate of the signals sent from the computer. The fuel/air ratio ranges from the minimum requirement to support the combustion process to the maximum which can be burned cleanly and efficiently. Fuel injection rates within these limits are based on the operator's demand for power as represented by his positioning of the throttle plate using the accelerator. Water injection rates are based on the amount of cooling which must be applied to prevent the heat generated during the compression stroke from igniting the fuel/air mixture prematurely. The result is an engine which burns more cleanly and efficiently and suffers no side effects commonly associated with lean-burning engines.

9 Claims, 3 Drawing Sheets

COORDINATED WATER AND FUEL INJECTION SYSTEM

FIELD OF THE INVENTION

This invention relates generally to internal combustion engines and more particularly to a fuel and water injection system for use in combination with such engines.

BACKGROUND OF THE INVENTION

Various fluids, such as water and water in solution with other substances, such as alcohol, have been commonly injected into hydrocarbon-fueled engines to provide improved engine operation. During the compression stroke, the water droplets vaporize and absorb heat energy produced within the combustion chamber to prevent pre-ignition. The vaporized water is subsequently heated by the burning fuel mixture during the power stroke and expands, increasing the mechanical efficiency of the combustion process. Beneficial side effects may include the prevention of carbon buildup on the cylinder walls of the engine. As a result of the beneficial effects of the water injection, the engine is able to run more smoothly and efficiently on a leaner fuel mixture. Additionally, the reduction in peak combustion chamber temperatures reduces the formation of oxides of nitrogen (Nox), and minimizes thermal stresses on engine components.

Various types of devices have been developed to introduce fluids into the intake air of internal combustion engines. These devices have included nozzle-type injectors in which the fluid is pumped directly into the engine, emulsion injection systems, and intake air humidifiers in which air is passed through a volume of water before being introduced into the engine. Direct injection of the fluid into the intake air has been limited by the inability of mechanical systems to precisely meter a relatively small volume of water to obtain an optimum volumetric ratio of water in the final fuel/air charge. Humidified air systems are impractical as the majority of the heat absorption capacity of the water lies in the phase transformation from liquid to gas.

Prior art systems have not been entirely successful to responses in engine requirements, largely due to the inability of purely mechanical devices to respond over a wide range in conditions. A method of supplying two different fluids to a common combustion chamber is described in U.S. Pat. No. 4,031,864 to W. T. Crothers. Water is used to achieve phase separation when methanol and gasoline are stored in a common tank, but are pumped from different levels within that tank. The primary purpose of this invention is to allow the use of two different fuels.

A method of supplying water during peak power demand periods in an internal combustion engine is described in U.S. Pat. No. 4,351,289 to V. A. Renda. Water injection is carried out with water from a reservoir pressurized by an injection pump which is energized only above predetermined torque demand levels, under the control of a vacuum switch sensing intake manifold vacuum.

A method of supplying water to an internal combustion engine for the purpose of allowing operation with leaner fuel mixtures is described by U.S. Pat. No. 4,461,245 to M. Vinokur. Intake manifold pressure is used to control the output of a water pump, thereby making the water injection rate responsive to engine load.

A method of providing water to the cylinders of turbocharged engines is described by U.S. Pat. No. 4,558,665 assigned to L. Sandberg. This system injects water into each cylinder individually and operates independently of the fuel system.

A system for water injection into internal combustion engines used to power generators is described by U.S. Pat. No. 4,960,080 to J. O'Neill, E. Schisler, and P. Kubo. The system is activated when the output current of the generator reaches a predetermined level which is associated with the onset of $NO_x$ emissions by the drive motor.

A system for injecting water into internal combustion engines having a spark ignition systems is described by U.S. Pat. No. 4,096,829 to G. Spears. The system operates a water injection pump at a rate proportional to engine RPM, where the RPM is sensed inductively off one of the ignition wires. Water injection rate is controlled by air flow through an atomizer.

A system for injecting water into a carburetor to allow operation with leanar fuel mixtures is described by U.S. Pat. No. 4,448,153 to R. Miller. A water injection pump is cycled on and off in response to such engine parameters as engine temperature, oil pressure and manifold pressure.

The prior art devices suffer from several problems. In general, they fail to provide a means of injecting water and fuel which is accurate enough to optimize fuel consumption over a wide range of operating conditions and power demand. Prior art systems also fail to provide a means of responding quickly to engine needs. The amount of water necessary to prevent preignition is relatively small, compared to the fuel injection rate. Prior art systems which relied on the starting and stopping of a water pump to control the water injection rate can not efficiently respond to dynamic engine operating conditions. Systems which rely solely on intake manifold pressure and engine RPM do not adequately control the water injection rate in a manner which is responsive to the need for cooling of the fuel charge during the compression stroke. The result is overly complex systems which do not address the root cause of preignition when operating an internal combustion with a lean fuel mixture, and, therefore, do not optimize engine performance.

It is an object of the present invention to provide a system for injecting fuel and a fluid, such as water into the intake air side of an internal combustion engine in response to engine operating parameters to optimize engine operation.

It is another object of this invention to provide a method of injecting fuel in response to engine load and at minimum concentrations necessary for efficient combustion.

It is another object of this invention to provide a method of injecting water in response to the rate of air intake and the rate of fuel injection.

It is another object of this invention to provide a method of injecting fuel and water in which optimum injection rates are achieved by controlling an electronic signal to electronic injectors in response to the rate of air flow through the intake manifold and the amount of power demanded by the operator.

It is another object of this invention to provide a fuel and water injection system which is inexpensive to manufacture and which is simple and reliable in operation.

It is another object of this invention to provide a means of reducing peak cylinder temperatures by absorbing some of the heat produced during the compression stroke in an internal combustion engine.

It is another object of this invention to minimize the production of oxides of nitrogen ($NO_x$) by reducing peak cylinder temperatures during the combustion process.

It is another object of this invention to increase the mechanical efficiency of internal combustion engines by minimizing the pressure buildup during the compression stroke by absorbing some of the heat generated in the gasses during said compression stroke.

It is another object of this invention to increase the mechanical efficiency of an internal combustion engine by adding gaseous water vapor which will increase the expansion volume of cylinder gasses during the power stroke.

It is another object of this invention to provide a means of operating a higher compression engine on traditional fuels without premature ignition.

SUMMARY OF THE INVENTION

The present invention provides a system for injecting water and fuel into an internal combustion engine in which the fuel injection rate is responsive to the operator's demand for power and the water injection rate is responsive to requirements to prevent premature ignition of the air/fuel mixture during the compression stroke of the engine. The water injection requirements are determined by a computer which calculates the shortfall in cooling provided by the vaporization of fuel droplets during the compression stroke and the amount of cooling required to prevent preignition during the compression stroke. The computer then controls water injection by sending electronic pulses to an electronic injector.

DESCRIPTION OF THE PREFERRED EMBODIMENT

The present invention provides an injection system for fuel and water into the intake air of an internal combustion engine. Both water and fuel are provided from constant-pressure supply systems and the injection rates are controlled by the pulse width and pulse repetition rate of electronic signals to the electronic injectors. The electronic control system receives electronic signals from systems which monitor throttle position and the rate of air flow in the intake manifold.

The present invention provides a system for improving the efficiency of an internal combustion engine having an air intake manifold and an operator controlled throttle comprising:
 a. at least one electronically actuated fuel injector;
 b. a fuel supply reservoir communicatively connected with said fuel injector and including fuel pumping means for maintaining constant fuel pressure at the inlet of said fuel injector;
 c. at least one electronically actuated water injector;
 d. a water supply reservoir communicatively connected with said water injector and including water pumping means for maintaining constant water pressure at the inlet of said water injector;
 e. an air flow measuring means for determining the rate of air flow through said air intake manifold;
 f. means for measuring power demand operatively associated with said throttle; and
 g. regulating means for controlling the rate at which atomized fuel and water are independently injected into the combustion fuel mixture of said engine, said means being operatively connected to said injectors and being responsive to both the rate of air flow in said air intake manifold and the position of said throttle.

Figure 1:
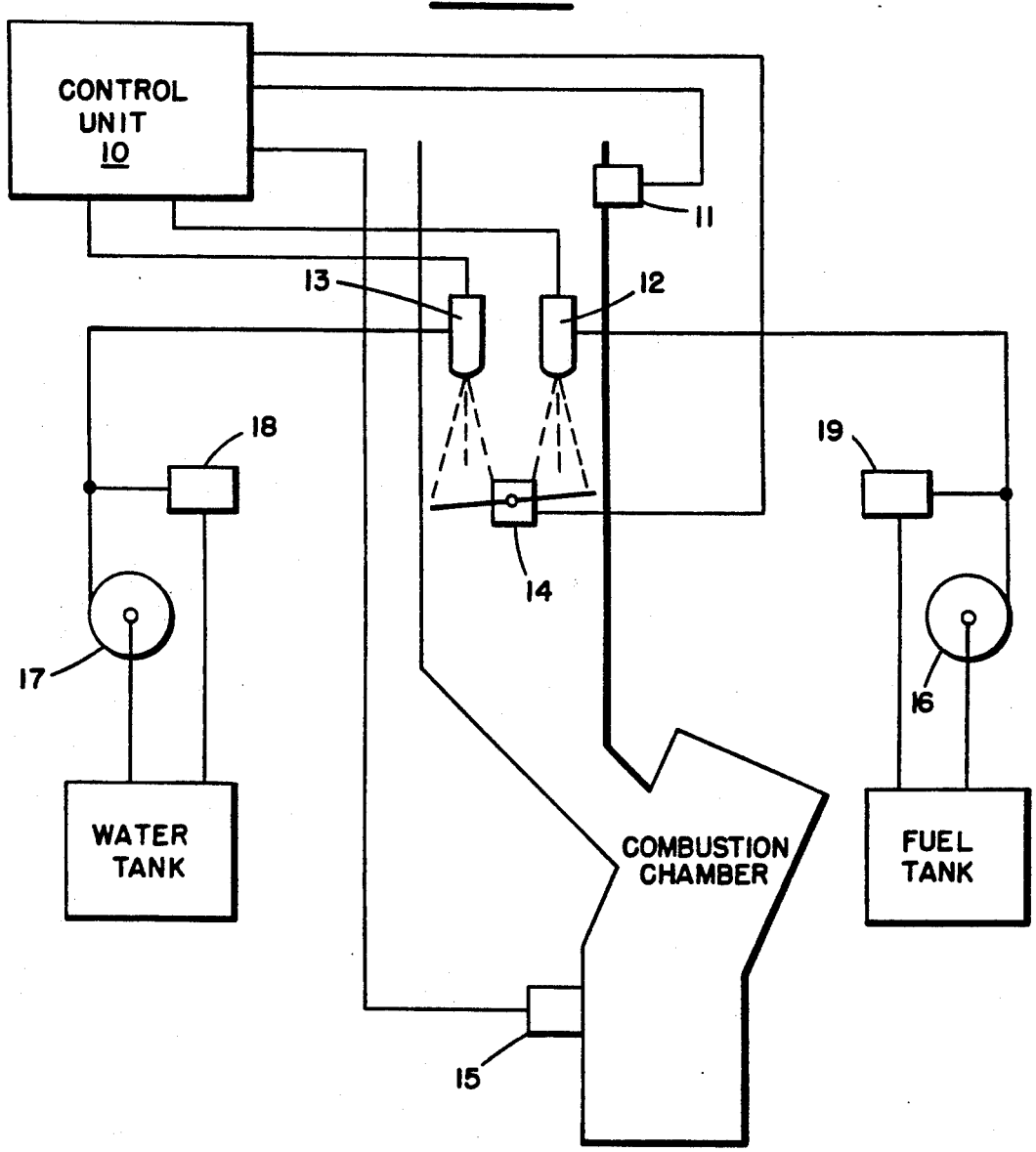
FIG. 1 is a schematic drawing of the dual injection systems and the control circuitry.

FIG. 1 is a schematic illustration of the overall computer controlled fuel system of the invention combined with an internal combustion engine. A computer controlled fuel system is provided which permits an internal combustion engine to operate at a very lean fuel/air ratio without premature ignition of the fuel/air charge during the compression stroke. A secondary benefit of this invention is to retain the ability of said engine to operate with richer fuel air charges during periods of peak power demand in order to maximize the power density of the engine to allow for minimum engine weight. Fuel computer 10 is adapted to control the operation of an electronic fuel injector 12 supplied with fuel at a constant pressure from a tank by means of a fuel pump 16 and pressure control valve 19 so as to control the amount of fuel injected directly into the intake manifold airstream or cylinder. Fuel computer 10 is also adapted to control the operation of an electronic water injector 13 supplied with water from a tank by means of a water pump 17 and pressure control valve 18 so as to control the amount of water injected directly into the intake manifold airstream or cylinder. The rate of air flow through the intake manifold is measured by an electronic air flow meter 11. The air flow meter measures the intake air flow by taking a part of that flow.

Figure 2:
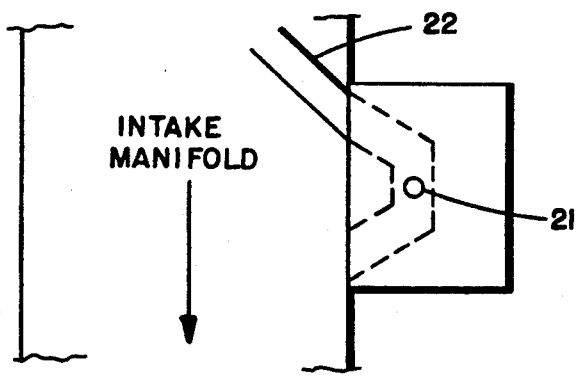
FIG. 2 is a schematic drawing of the inlet manifold air flow meter.

Measurements are made in such a manner that the control unit 10 receives an electrical signal which varies in accordance with the amount of heat radiated by a hot wire 21 placed in the intake air stream as illustrated in FIG. 2. When intake air flows into the intake manifold through a route 22 around the hot wire 21, the heat generated by the electric current flowing through the hot wire is carried away by the air. The amount of heat varies with the air flow. The temperature of the wire itself is thermostatically controlled. The amount of current necessary to maintain the temperature of the hot wire therefore provides an indication of the amount of air flowing through the intake manifold. The electronic control unit 10 senses the amount of current used by the hot wire.

Figure 4:
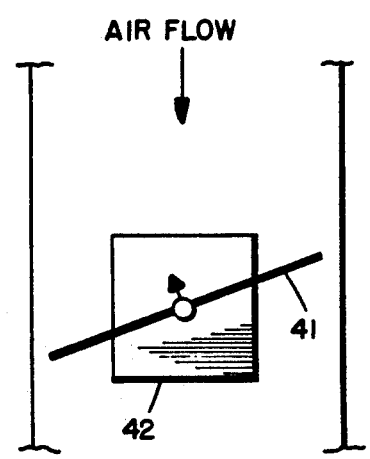
FIG. 4 is a drawing which shows how the throttle position measuring device is mounted to the throttle assembly.

A position sensor 42 e.g., a throttle plate position measuring device, illustrated in FIG. 4 is connected to the throttle plate 41 located in the intake manifold. The position of this plate, which is determined by the operator, serves as a signal representing the amount of power demanded by the operator.

Figure 5:
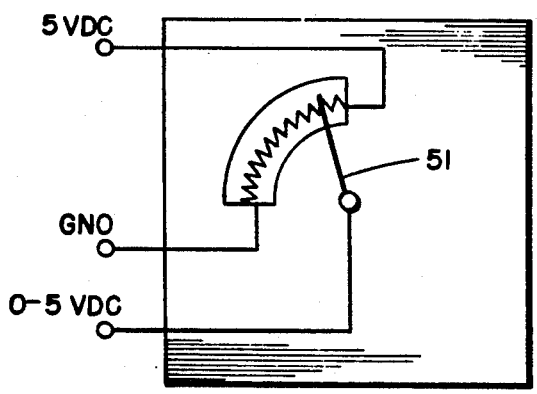
FIG. 5 is a drawing of the potentiometer used to convert throttle position to an electrical signal.
Figure 8:
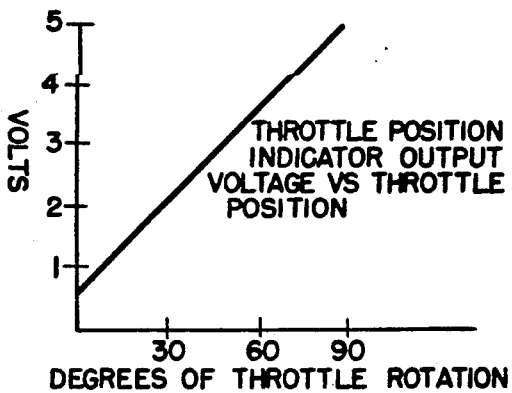
FIG. 8 is a graph which shows the output of an electronic device used to measure throttle position.

As the throttle is moved, a variable resistor 51 attached to the throttle also moves as indicated in FIG. 5. This resistor has a constant input voltage but the amount of output voltage varies as the throttle is rotated, i.e., through 0 to 5 Volts Direct Current as shown. Increasing the throttle cuts resistor elements out of the circuit. At full throttle, the output voltage is very near the input voltage. The output of this device is indicated in FIG. 8. Therefore, based on the measured position of the throttle plate and the rate of air flow through the intake manifold, the computer will calculate a fuel injection rate and water injection rate so as to provide the power demanded by the operator, minimize fuel consumption to the absolute minimum required to produce that power, and provide enough cooling water to prevent premature ignition of the fuel charge during the compression stroke.

Referring back to FIG. 1, fuel is supplied to (an) electronic injector(s) 12 by a system consisting of a fuel pump 16, a pressure control valve 19, and associated piping. The fuel pump 16 can be of a number of designs provided that it deliver the maximum fuel consumption rate at the working pressure of the fuel injector(s) 12.

Figure 3:
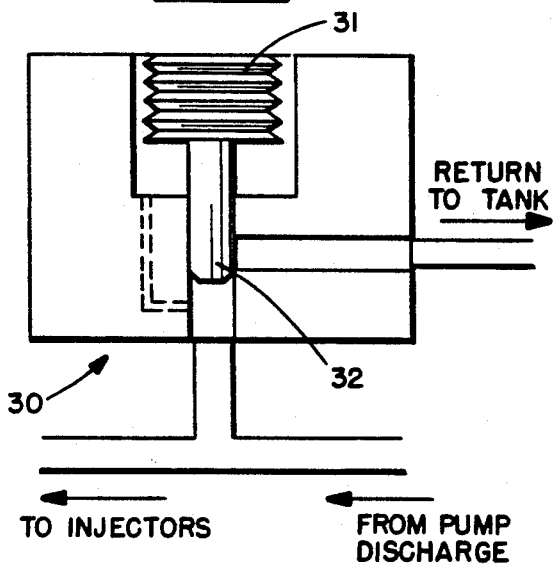
FIG. 3 is a drawing of the valves which maintain constant fuel and water delivery pressure.

A pressure control valve 30, shown in FIG. 3, maintains the pressure at the discharge of the pump at a constant value regardless of the flow rate the through the pump. A constant pressure is required at the inlet to the fuel injector(s) so that flow rate through the injectors can be accurately predicted based on pulse width and pulse repetition rate of the signal sent from the electronic control unit. When pressure at the discharge of the fuel pump is too high, the fuel pressure compresses a bellows 31 in the pressure control valve 30 which opens valve stem 32 to direct fuel back to the fuel tank until pressure returns to the desired value.

Similarly, as shown in FIG. 1, water is supplied to (an) electronic injector(s) 13 by a system consisting of a water pump 17, a pressure control valve 18, and associated piping. The water pump can be of a number of designs provided that it deliver the maximum water consumption rate at the working pressure of the water injector(s). As shown in FIG. 3, a pressure control valve 30, similar to the valve described above, maintains the pressure at the discharge of the pump at a constant value regardless of the flow rate the through the pump. A constant pressure is required at the inlet to the water injector(s) so that flow rate through the injectors can be accurately predicted based on pulse width and pulse repetition rate of the signal sent from the electronic control unit. When pressure at the discharge of the water pump is too high, the water pressure compresses a bellows 31 in the pressure control valve which moves valve stem 32 to direct water back to the water tank until pressure returns to the desired value.

Electronic fuel and water injectors can be mounted in the intake manifold such that one set of injectors supplies all combustion cylinders or a separate injector may be used to supply fuel and water for each cylinder.

Figure 9:
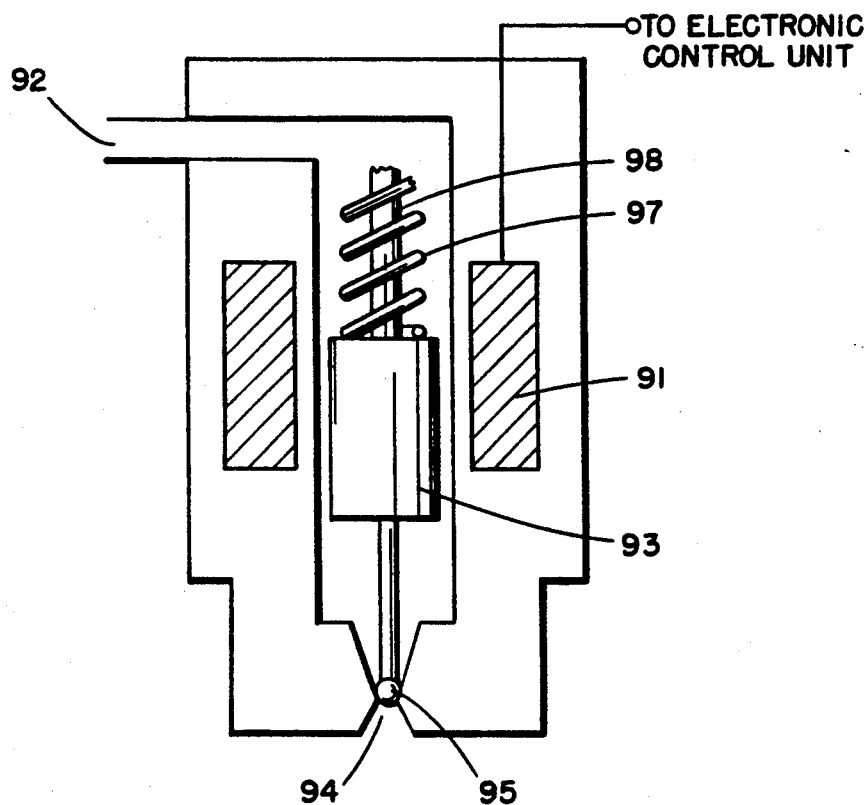
FIG. 9 is a diagram of an electronic injector of the type used to inject fuel and water into the engine intake air.

The fuel and water injectors are illustrated in FIG. 9. These elements are solenoid operated ball valves. When energized by a signal from the control computer, magnetic windings 91 exert an electromagnetic force on armature 93. The electromagnetic force opposes the force of spring 97 and raises the armature, which is communicatively attached to valve stem 98. The valve stem 98 raises the ball 95 off the seat, allowing fuel or water to spray through fuel/water inlet 92 through a nozzle 94 and into the intake manifold. The timing of the signals to these valves is coordinated with the fuel intake of the cylinders. The number of times each injector will open during each engine revolution depends on the number of cylinders in the particular engine and the number of injectors used in the particular application. The amount of fuel or water delivered during the intake stroke for a given cylinder is a function of the pulse width of the signal sent to the injector. The injector will remain open and pass atomized fuel or water into the intake manifold as long as it is energized.

Under normal operating conditions, the fuel injection rates are determined and set at some value between the lean limit and the stoichiometric limit. For the purpose of this invention, the lean limit is defined as the minimum fuel/air ratio which will burn efficiently in the combustion chamber of the engine. The stoichiometric limit is defined as the fuel/air ratio at which there is just enough oxygen present to allow the complete combustion of all of the fuel present, assuming ideal conditions. The stoichiometric ratio for all engines is approximately 1:14.7. The lean limit varies greatly with individual engine designs but is typically no leaner than 1:28.

Figure 6:
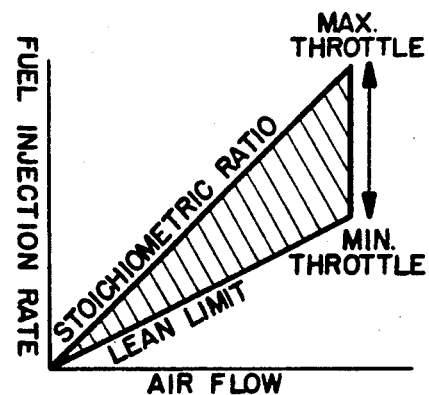
FIG. 6 is a graph which explains the methodology for converting engine conditions into signals for the control of fuel and water injection rates.

As indicated in FIG. 6, the fuel injection rate is determined as a function of air flow rate and throttle position. For a given air flow rate, fuel injection rate would be calculated as follows:

$$FI(MAF, TP) = LL(MAF) + TP(SR(MAF) - LL(MAF))$$

where
MAF is the mass air flow rate through the intake manifold.
FI (MAF, TP) is the fuel injection rate for a given mass air flow rate and throttle position.
LL is the lean limit associated with the mass air flow.
TP is the throttle position.
SR (MAF) is the stoichiometric ratio associated with a given mass air flow.

Figure 7:
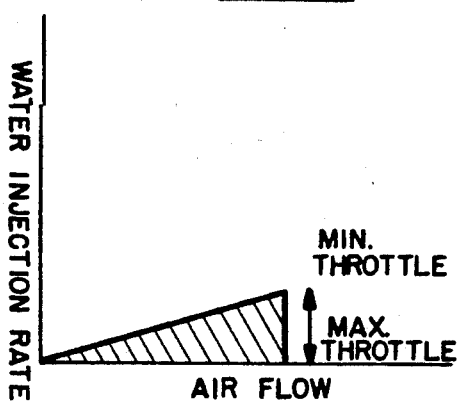
FIG. 7 is a graph which shows how water injection rate varies as a function of air flow through the intake manifold and throttle position.

Water injection rate would vary as a function of the throttle position and intake manifold air flow rate between zero and a maximum rate based on engine type for the given rate of air flow as indicated in FIG. 7.

The optimum fuel injection rates in an engine at normal operating temperatures will not suffice in a cold engine. In a cold engine, not enough fuel will vaporize during the compression stroke to provide complete combustion. Additionally, some of the fuel will impinge on the cold walls of the intake manifold and never reach the combustion chamber. Therefore, a higher fuel injection rate is required to provide enough burnable fuel to the combustion chamber for smooth operation during cold startups. Similarly, water injection may not be necessary to prevent preignition when the engine components are cold. In order to provide for an alternate set of fuel and water injection rates for cold engine operation, a temperature sensor 15 is positioned in the engine coolant as shown in FIG. 1. This sensor provides an indication of engine temperature to the fuel and water injection computer 10. The computer uses this indication of temperature to provide a richer fuel mixture for several minutes after startup, then shifts to the optimum economy ratios after engine temperature reaches a predetermined setpoint.

Figure 10:
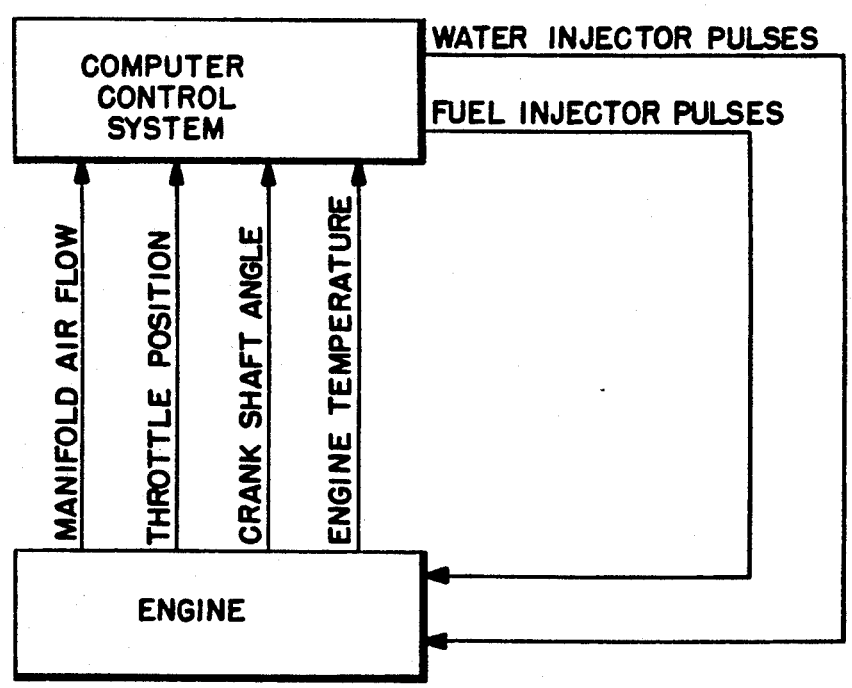
FIG. 10 is a functional diagram which shows the signal flowpaths between the computer control unit and various engine components.

The signal flow paths necessary to achieve these results are shown in FIG. 10.

There may be times when the operator chooses to disable the water injection portion of the system. A manually operated switch may be provided to allow the system to inject fuel at the stoichiometric ratio with no water injection.

In its preferred embodiment, the features of this invention would be fully integrated into a computerized engine control system which also controls ignition signals and other assorted engine control functions.

What is claimed is:

1. A system for improving the efficiency of an internal combustion engine having at least one combustion chamber, an air intake manifold and an operator controlled throttle comprising:
   a) at least one electronically actuated fuel injector;
   b) a fuel supply reservoir communicatively connected with said fuel injector and including fuel pumping means for maintaining constant fuel pressure at the inlet of said fuel injector;
   c) at least one electronically actuated water injector;
   d) a water supply reservoir communicatively connected with said water injector and including water pumping means for maintaining constant water pressure at the inlet of said water injector;
   e) an air flow measuring means for determining the rate of air flow through said air intake manifold;
   f) means for measuring power demand operatively associated with said throttle; and
   g) regulating means for controlling the rate at which atomized fuel and water are independently injected into the combustion fuel mixture of said engine, said means being operatively connected to said injectors and being responsive to both the rate of air flow in said air intake manifold and the position of said throttle, wherein the amount of water injected into said combustion fuel mixture is controlled as a function of both the amount of fuel injected and the ratio of fuel to air in said combustion fuel mixture to prevent premature detonation thereof in said combustion chamber over the operating range of said engine.

2. The system of claim 1 wherein said fuel and water injectors are positioned to inject into said intake manifold airstream.

3. The system of claim 2 wherein said regulating means includes an electronic input carrying a voltage which is a function of the position of said throttle.

4. The system of claim 3 wherein said regulating means includes an electronic input which is a function of the rate of air flow in said intake manifold.

5. A system for improving the efficiency of an internal combustion engine having an air intake manifold and an operator controlled throttle comprising:
   a) at least one electronically actuated fuel injector;
   b) a fuel supply reservoir communicatively connected with said fuel injector and including fuel pumping means for maintaining constant fuel pressure at the inlet of said fuel injector;
   c) at least one electronically actuated water injector;
   d) a water supply reservoir communicatively connected with said water injector and including water pumping means for maintaining constant water pressure at the inlet of said water injector;
   e) an air flow measuring means for determining the rate of air flow through said air intake manifold;
   f) means for measuring power demand operatively associated with said throttle; and
   g) regulating means for controlling the rate at which atomized fuel and water are independently injected into the combustion fuel mixture of said engine, said means being operatively connected to said injectors and being responsive to both the rate of air flow in said air intake manifold and the position of said throttle;
   said regulating means including;
   h) an internal program which contains the stoichiometric air fuel ratios of the empirically derived lean operating limits for said engine at various rates of air flow;
   i) an internal program which determines the fuel injection rate above the lean limit as a function of the position of the throttle;
   j) an internal program which calculates an amount of water which must be injected along with the fuel to prevent premature detonation of the fuel/air charge; and
   k) an internal program which converts the desired rates of fuel and water delivery for the engine into electronic pulses controlling the degree of the opening and shutting of the electronic fuel and water injectors.

6. The system of claim 5 wherein said fuel and water injectors are positioned to inject into said intake manifold airstream.

7. The system of claim 5 wherein said regulating means includes an electronic input carrying a voltage which is a function of the position of said throttle.

8. The system of claim 5 wherein said regulating means includes an electronic input which is a function of the rate of air flow in said intake manifold.

9. The system of claim 5 wherein said regulating means further includes means responsive to engine temperature to vary the fuel:air ratio such that a richer fuel mixture may be provided in said manifold when the engine is run below normal operating temperatures.

* * * * *